US010717431B2

(12) United States Patent
Anderson et al.

(10) Patent No.: US 10,717,431 B2
(45) Date of Patent: *Jul. 21, 2020

(54) CARGO VEHICLE LOADING CONTROL

(71) Applicant: International Business Machines Corporation, Armonk, NY (US)

(72) Inventors: Evelyn R. Anderson, Houston, TX (US); Michael Bender, Rye Brook, NY (US); Michael Boone, Lutz, FL (US); Rhonda L. Childress, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/012,862

(22) Filed: Jun. 20, 2018

(65) Prior Publication Data
US 2018/0312162 A1 Nov. 1, 2018

Related U.S. Application Data

(63) Continuation of application No. 15/907,715, filed on Feb. 28, 2018, now Pat. No. 10,106,151, which is a
(Continued)

(51) Int. Cl.
*B60W 30/02* (2012.01)
*B60R 1/00* (2006.01)
*B60P 7/06* (2006.01)

(52) U.S. Cl.
CPC .............. *B60W 30/02* (2013.01); *B60P 7/06* (2013.01); *B60R 1/00* (2013.01); *B60R 2300/8006* (2013.01)

(58) Field of Classification Search
CPC .. B60W 30/02; B60P 7/06; B60R 1/00; B60R 2300/8006
See application file for complete search history.

(56) References Cited

U.S. PATENT DOCUMENTS 5,686,888 A 11/1997 Welles, II et al.
6,434,512 B1 8/2002 Discenzo
(Continued)

OTHER PUBLICATIONS

P. Mell et al., "The Nist Definition of Cloud Computing", National Institute of Standards and Technology, Information Technology Laboratory, Sep. 2011, pp. 1-7.
(Continued)

*Primary Examiner* — Aaron L Troost
(74) *Attorney, Agent, or Firm* — Law Office of Jim Boice

(57) ABSTRACT

A method, system, and/or computer program product controls positioning of cargo being loaded onto a cargo vehicle based on sensor readings from another cargo vehicle. One or more processors receive output from a cargo sensor that describes shifting experienced by a first cargo while being transported by a first cargo vehicle, and based on the output, determine that the first cargo has shifted beyond a predetermined amount. The processor(s) transmit instructions to a robotic cargo loader of second cargo being loaded onto a second cargo vehicle to adjust a positioning of the second cargo while being loaded onto the second cargo vehicle based on the first cargo shifting beyond the predetermined amount while being transported by the first cargo vehicle, where the positioning of the second cargo in the second cargo vehicle is different from a positioning of the first cargo on the first cargo vehicle.

20 Claims, 8 Drawing Sheets

Related U.S. Application Data continuation of application No. 15/173,953, filed on Jun. 6, 2016, now Pat. No. 10,005,456.

(56) References Cited

U.S. PATENT DOCUMENTS

| | | | |
|---|---|---|---|
| 6,654,681 | B1 | 11/2003 | Kiendl et al. |
| 7,421,334 | B2 | 9/2008 | Dahlgren et al. |
| 9,089,969 | B1 | 7/2015 | Theobald |
| 2008/0167817 | A1 | 7/2008 | Hessler |
| 2010/0287073 | A1 | 11/2010 | Kocis |
| 2016/0009276 | A1 | 1/2016 | Moeller |
| 2016/0050356 | A1 | 2/2016 | Nalepka |
| 2017/0161673 | A1 | 6/2017 | High |

OTHER PUBLICATIONS

Anonymous, "Sensors: Track, Monitor, Report", Elite Vehicle Intelligence System, elitevis.com, 2011, Retrieved Oct. 22, 2015, pp. 1-4.

List of IBM Patents or Patent Applications Treated as Related, Jun. 19, 2018, 2 Pages.

U.S. Appl. No. 15/907,715 Non-Final Office Action dated May 17, 2018.

U.S. Appl. No. 15/173,953 Non-Final Office Action dated Aug. 4, 2017.

CARGO VEHICLE LOADING CONTROL

BACKGROUND

The present disclosure relates to the field of vehicles, and specifically to the field of vehicles that transport cargo. Still more specifically, the present disclosure relates to the field of loading cargo onto a cargo vehicle based on a state of cargo being transported by the vehicle and/or another vehicle.

Cargo being transported on transport vehicles is subject to damage caused by movement of the transport vehicle. For example, a roadway that is unduly rough (e.g., has many potholes) or winding (e.g., has many turns) may cause cargo within a truck to shift and fall over, resulting in breakage of fragile cargo when falling, if struck by other falling cargo, if colliding with an interior of the truck or other cargo as the truck stops, starts, or turns suddenly, etc.

SUMMARY

In accordance with one or more embodiments of the present invention, a method, system, and/or computer program product controls positioning of cargo being loaded onto a cargo vehicle based on sensor readings from another cargo vehicle. One or more processors receive output from a cargo sensor that describes shifting experienced by a first cargo while being transported by a first cargo vehicle, and based on the output, determine that the first cargo has shifted beyond a predetermined amount. The processor(s) transmit instructions to a robotic cargo loader of second cargo being loaded onto a second cargo vehicle to adjust a positioning of the second cargo while being loaded onto the second cargo vehicle based on the first cargo shifting beyond the predetermined amount while being transported by the first cargo vehicle, wherein the positioning of the second cargo in the second cargo vehicle is different from a positioning of the first cargo on the first cargo vehicle.

DETAILED DESCRIPTION

Figure 1:
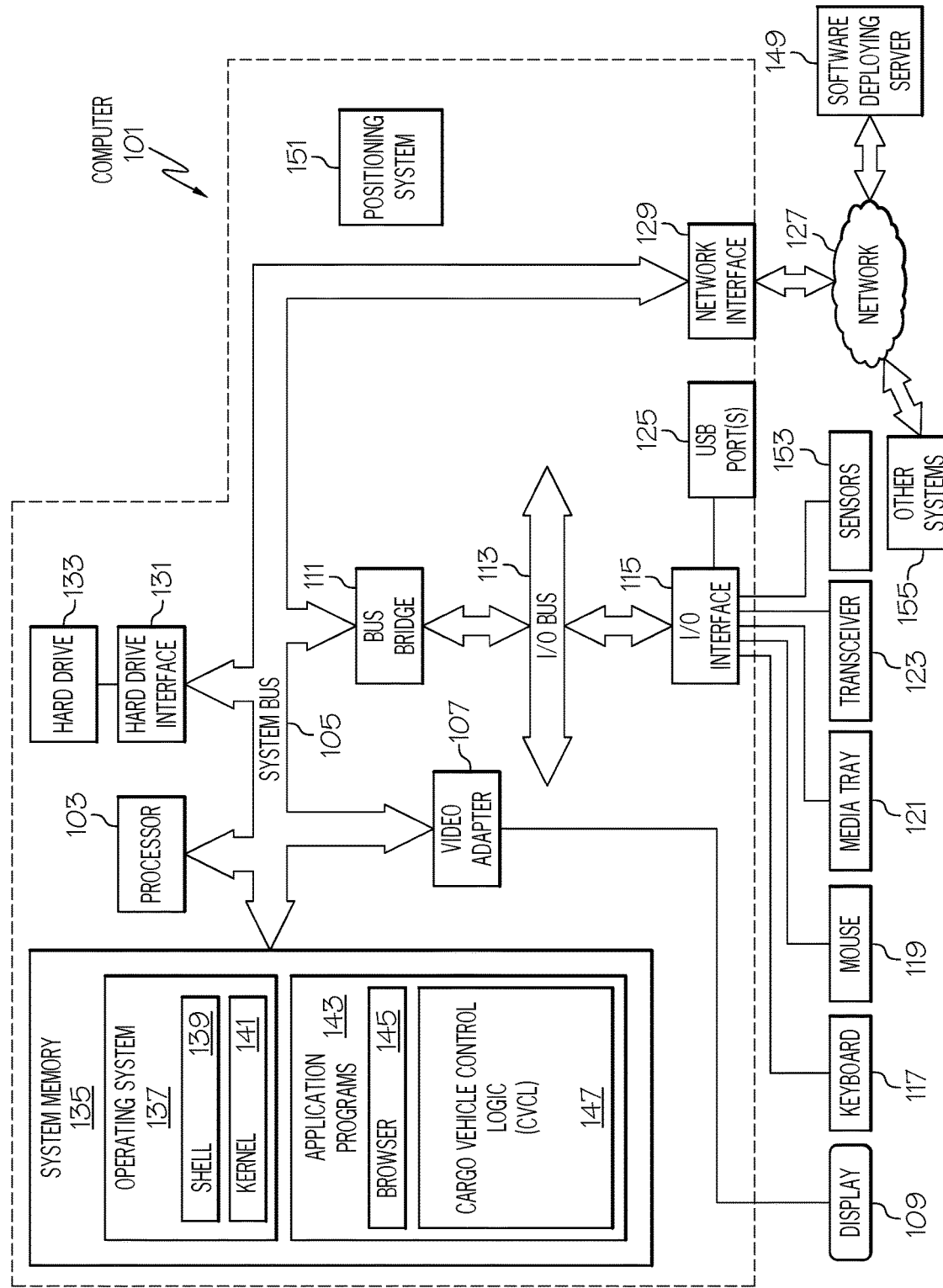
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or vehicle controller 201 and/or cargo controller 204 shown in FIG. 2, and/or a self-driving vehicle (SDV) on-board computer 301 shown in FIG. 3, and/or a robotic cargo loader controller 501 and/or cargo scanner 512 and/or microprocessor 519 shown in FIG. 5.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other systems 155 (e.g., establishing communication among SDV 302, Controller 201, etc. as described and depicted in the figures herein) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Cargo Vehicle Control Logic (CVCL) 147. CVCL 147 includes code for implementing the processes described below, including those described in FIGS. 2-6. In one embodiment, computer 101 is able to download CVCL 147 from software deploying server 149, including in an on-demand basis, wherein the code in CVCL 147 is not downloaded until needed for execution. In one embodiment of the present invention, software deploying server 149 performs all of the functions associated with the present invention (including execution of CVCL 147), thus freeing computer 101 from having to use its own internal computing resources to execute CVCL 147.

Also within computer 101 is a positioning system 151, which determines a real-time current location of computer 101 (particularly when part of a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101. More specifically, sensors 153 are able to detect vehicles, road obstructions, pavement, etc., when implemented in a truck or similar land-based vehicle. For example, if computer 101 is on board a vehicle, including but not limited to a self-driving vehicle (SDV) (e.g., SDV on-board computer 301 shown in FIG. 3), then sensors 153 may be cameras, radar transceivers, etc. that allow the SDV to detect the environment (e.g., road obstructions, pavement, conditions, etc.) of that SDV, thus enabling it to be autonomously self-driven. Similarly, sensors 153 may be cameras, thermometers, moisture detectors, etc. that detect ambient weather conditions and other environmental conditions of a roadway upon which the vehicle/SDV is traveling, as well as conditions of cargo being transported by such vehicles/SDVs.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Freight and cargo tend to shift during transit, thus increasing the chances of damage to such freight/cargo. However, damage or imminent damage to the cargo is not noticed until the cargo vehicle transporting the cargo arrives at its destination, since the cargo is typically in a trailer or other portion of the cargo vehicle whose interior is not visible to the driver. Furthermore, other cargo vehicles traveling along the same route with similarly packed cargo often damage their cargo as well, thus "repeating the mistakes" of leading vehicles by driving too fast, swerving too much, having improperly secured straps, etc. Thus, the present invention provides a solution that invokes a corrective action on the transporter (cargo vehicle) based on sensor readings from one or more cargo vehicles.

More specifically, the present invention leverages aggregate information from sensors and video cameras to determine if the freight or cargo has shifted beyond prescribed tolerance levels in a first cargo transporter (cargo vehicle). In response to detecting such shifting and/or damage to the cargo in the first cargo transporter, a warning is issued to the first cargo transporter and/or to other cargo transporters to take proactive measures to correct and/or ameliorate the cargo shifts, in order to prevent damage or prevent further damage to the freight or cargo. The video cameras also provide views into the shipping compartments (also referenced herein as cargo bays, cargo containers, etc.) to help the transporter determine which ameliorative steps should be taken.

Additionally, the analytics described herein may result in a notification to a subscription service (for other cargo transporters) of potential hazards, road conditions, and re-routing information. For example, data from an internet of things (TOT) sensors (e.g., sensors on the cargo, the cargo bay, and/or the cargo vehicle) and video from the cargo bay/cargo vehicle may be transmitted to an analytics system, which processes such data in order to determine/recommend next actions to be taken (e.g., directing the cargo vehicle to stop, reposition the cargo, take a different route, etc.).

Thus, various embodiments of the present invention provide a system for reducing cargo damage during shipping using sensors and video cameras (which detect cargo shifting) by the use of a learned tolerance level for present and/or future shipments, for the same or similar contents and for the same or similar driving conditions. As described herein in one or more embodiments, the present invention directs the cargo vehicle to take appropriate actions needed to protect its cargo, and to warn other cargo vehicles that are carrying cargo that is at risk, and thus need to take preventative actions. Such directives may be individualized based on the weight of the cargo, risk of damage to the cargo, and previous experiences transporting that type of cargo.

As mentioned above, various types of transport vehicles transport cargo. Such transport vehicle types may be tracked (e.g., freight cars, also known as goods wagons, which are part of a train), roadway-based (e.g., trucks, vans, etc.), airborne (e.g., cargo planes), or water-borne (e.g., cargo ships). While the present invention is illustrated in an embodiment in which the transport vehicle is a cargo truck, the features described with regard to protecting cargo being hauled by a cargo truck are also applicable to other types of transporters (e.g., freight cars, cargo planes, cargo ships, etc.). That is, freight cars and/or cargo planes/ships may also be equipped with the sensors/cameras/analytics described herein for cargo trucks, with similar control actions implemented in order to protect the cargo being transported on such freight cars and/or cargo planes/ships.

Figure 2:
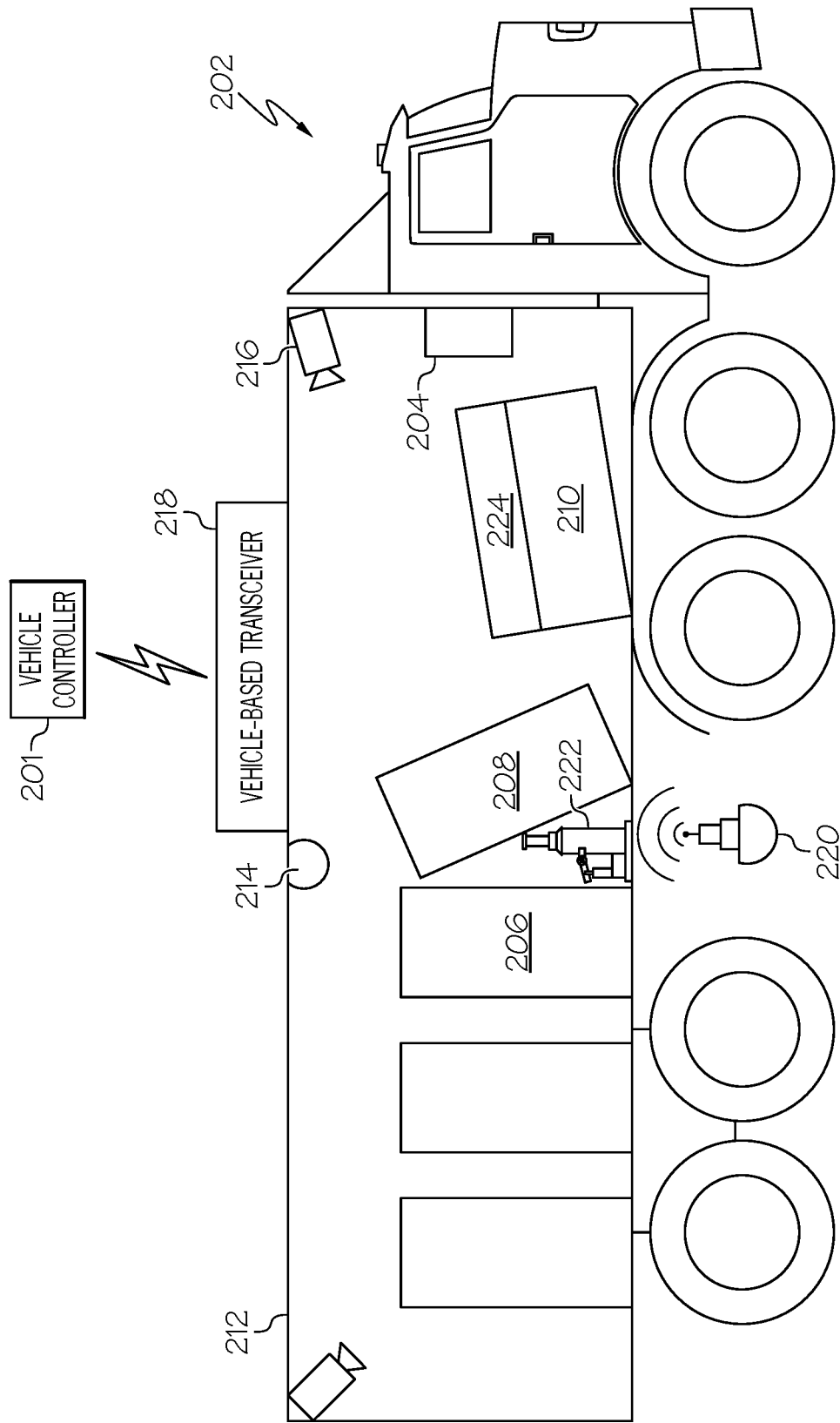
FIG. 2 illustrates an exemplary cargo vehicle transporting cargo whose state has been compromised.

The cargo depicted in the figures of the present disclosure is shown being transported on a cargo truck (e.g., cargo vehicle 202 shown in FIG. 2). As depicted and described herein, if a roadway upon which the cargo truck is traveling is unduly rough or winding, then its cargo may shift and fall over.

With reference now to FIG. 2, consider cargo vehicle 202, which is a truck that is transporting cargo contained in boxes 206, 208, and 210. Within the cargo container 212 (e.g., a trailer, a box container, a semi-trailer, a cargo bay, etc. that is being transported as part of the cargo vehicle 202) is a cargo state sensor 214 and at least one cargo bay camera 216.

Cargo state sensor 214 is a hardware sensor that is able to detect the positioning and/or any movement of the cargo within the cargo container 212. Examples of cargo state sensor 214 include, but are not limited to, vibration sensors, sound sensors, chemical sensors, light sensors, etc. That is, movement of one or more of the boxes 206-210 will result in vibration of the cargo container 212 floor and/or walls (as detected by the vibration sensor); noise within the cargo container 212 (as detected by the sound sensor); breakage of a liquid container in one or more of the boxes 206-210 (as detected by the chemical sensors); a break in a soft wall of the cargo container 212 (as detected by the light sensors), etc.

Errant movement of the boxes 208 or 210 may be caused by a sudden stop or quick start of the cargo vehicle 202, swerving back and forth by the cargo vehicle 202, the incline of the road traveled, etc. This errant movement is detected by the cargo vehicle state sensor 220, which may be a vibration sensor, an accelerometer, a microphone, etc.

For example, assume that cargo vehicle state sensor 220 is a vibration sensor. If a roadway upon which the cargo vehicle 202 is traveling is in poor condition (e.g., has lots of potholes, is an uneven/unimproved roadway, etc.), then the cargo vehicle 202 will be subjected to excessive levels of vibration, as detected by the vibration sensor that is part of the cargo vehicle state sensor 220.

For example, assume that cargo vehicle state sensor 200 is a gyroscope. If a roadway upon which the cargo vehicle 202 is traveling has a 12 degree grade, then the cargo vehicle will have excessive movement for any cargo that is susceptible at that level of incline.

Alternatively, assume that cargo vehicle state sensor 220 is an accelerometer, which detects changes in motion/acceleration to the cargo vehicle 202 when stopping, starting, moving laterally, etc. If cargo vehicle 202 experiences a sudden large change in acceleration (from stopping, starting, changing lanes, swerving, etc.), then the cargo vehicle 202 will be subjected to excessive levels of movement, including lateral movement. Such excessive levels of movement may ultimately result in box 208 falling against box 206 and/or box 210 falling down, as detected by the cargo bay camera 216 and/or a vibration sensor within cargo vehicle state sensor 220.

Alternatively, assume that cargo vehicle state sensor 220 is a microphone (sound sensor). If a roadway upon which the cargo vehicle 202 is traveling is in poor condition (e.g., has lots of potholes, is an uneven/unimproved roadway, etc.), then the cargo vehicle 202 will be subjected to excessive noise levels, as detected by the microphone that is the cargo vehicle state sensor 220. Similarly, the microphone that is part of the cargo vehicle state sensor 220 will detect the noise created when box 208 and/or 210 fall over.

A cargo vehicle state sensor 220 is able to sense the operational state of the cargo vehicle 202 and/or the environment around the cargo vehicle 202. For example, assume that cargo vehicle state sensor 220 is a camera aimed at the tires on the cargo vehicle 202. Thus, this camera is able to capture an image showing the amount and type of tread on the tires, any bald spots on the tires, etc. Similarly, such a camera can capture a video image of foreign objects trapped under the cargo vehicle 202, the condition of the roadway upon which the cargo vehicle 202 is traveling, etc.

The state of the cargo can also be evaluated by one or more box sensors that are affixed to the boxes (206, 208, 210) and/or their content. For example, a box sensor 224, shown affixed to box 210, may be an accelerometer, vibration sensor, microphone, etc. that detects movement of box 210, including but not limited to shifting, falling over, etc. Thus, when affixed to box sensor 224, box 210 becomes part of an Internet-of-things, which are items that are able to communicate with other items, controllers, etc. to create an overall description of the state of cargo being transported by various vehicles.

When evaluating the state of the cargo within the cargo container 212, the vehicle controller 201 may compare video images of the cargo captured by cargo bay camera 216 over time. Thus, by comparing the position of the cargo over different periods of time (and utilizing a known object's size), the vehicle controller 201 can determine how much movement has occurred. For example, assume that cargo bay camera 216 has captured a first image at time $T_1$ and a second image at time $T_2$ of box 206. Assume further that box 206 has shifted such that the captured image of box 206 has moved 2 degrees between the first image and the second image. Without knowing how far away box 206 is from cargo bay camera 216 and the size of box 206, then the system is unable to determine how far box 206 has actually moved. However, the manifest and or loading plan for the cargo container 212 (available to the vehicle controller 201) will have this information, in order to trigonometrically calculate the distance that box 206 moved during the shift.

The information that is collected about the state of the cargo within the cargo container 212 (e.g., from cargo state sensor 214 and/or cargo bay camera 216) and the state of the cargo vehicle 202 (e.g., from cargo vehicle state sensor 220) is collected and evaluated by cargo controller 204, in order determine the state of the cargo within cargo container 212 and/or the state of the cargo vehicle 202. That is, based on the sensor readings from cargo state sensor 214 and the images from cargo bay camera 216, the cargo controller 204 is able to determine that box 208 and box 210 have fallen. Similarly, the cargo vehicle state sensor 220 is able to determine the operational state of the cargo vehicle 202 (e.g., sudden stopping, fast starts, swerving, tire condition, etc.) and/or the environmental state of the cargo vehicle 202 (e.g., road vibration, weather) around the cargo vehicle 202 based on readings from cargo vehicle state sensor 220.

The evaluated sensor readings describing the state of the cargo within the cargo container 212 and/or the cargo vehicle 202 are then sent by the cargo controller 204 to the vehicle based transceiver 218, which wirelessly uploads this information to a vehicle controller 201. The vehicle controller 201 then issues instructions to cargo vehicle 202 and/or other vehicles to modify their behavior, in order to avoid any further damage to the cargo and/or to prevent such damage to other cargo as a result of falling over. That is, ameliorative instructions are issued to the operator of cargo vehicle 202 to reposition and/or secure boxes 208 and 210 in order to prevent any more damage to their content, and/or to alter the operation of the cargo vehicle 202 (e.g., slow down, make smoother lane changes, take an alternate route, etc.). Furthermore, other vehicles are able to modify how their cargo is loaded and/or secured based on the previously learned behavior of the cargo within and movement by cargo vehicle 202.

In order to prevent the type of event experienced by cargo vehicle 202 (e.g., boxes 208 and 210 falling over), instructions may also be sent to other vehicles (that are similar to cargo vehicle 202) that are carrying similar cargo (contained in boxes similar to boxes 208 and 210) on roadways (that are similar to that being traveled upon by cargo vehicle 202), directing these other vehicles to slow down before their cargo is damaged, to take an alternate route, etc. (The system will know that two cargo vehicles are containing similar cargo based on a comparison of their respective manifests, which may be maintained by a supervisory system, such as part of the vehicle controller 201 shown in FIG. 2.)

In one or more embodiments of the present invention, ameliorative instructions can activate a cargo repositioning mechanism 222, which is an electromechanical device that pushes box 208 back to an upright position when activated.

These corrective instructions may be issued to a human operator of the cargo vehicle 202 and/or other cargo vehicles that are operated by human drivers. However, in another embodiment, such instructions are sent to cargo vehicles that are self-driving vehicles (SDVs), in order to automatically control their operation, thereby protecting their cargo.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

Figure 3:
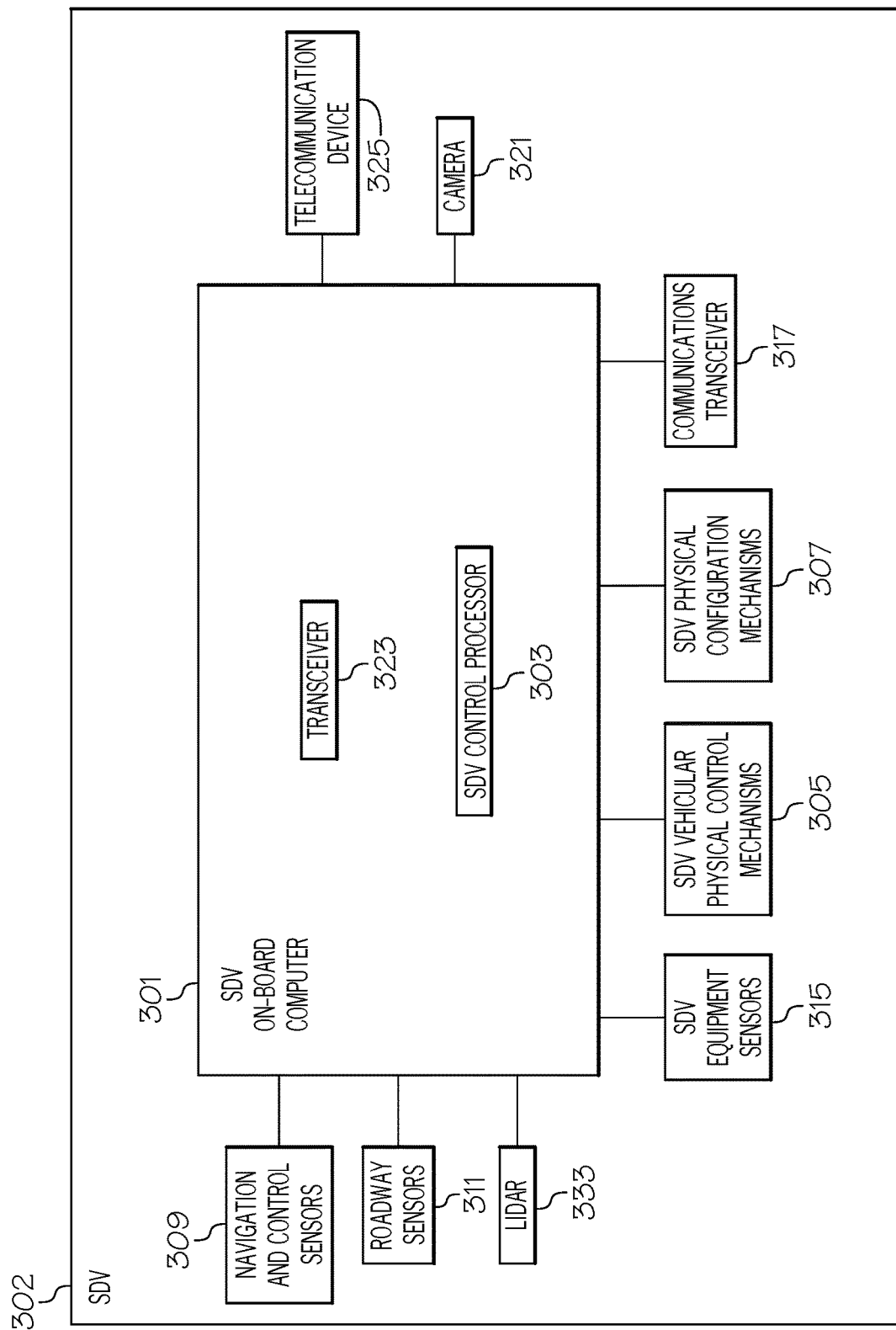
FIG. 3 depicts additional detail of hardware within an exemplary self driving vehicle (SDV) that may be utilized as a cargo vehicle in one or more embodiments of the present invention.

With reference now to FIG. 3, additional details of components within an SDV such as exemplary SDV 302 (an autonomous version of the cargo vehicle 202 shown in FIG. 2) are presented. As shown in FIG. 3, SDV 302 has an SDV on-board computer 301 that controls operations of the SDV 302. Thus, vehicle controller 201 shown in FIG. 2 is wirelessly coupled to the SDV on-board computer 301 in order to be able to control the movement and operation of SDV 302. While in autonomous mode, SDV 302 operates without the input of a human driver, such that the engine, steering mechanism, braking system, horn, signals, etc. are controlled by the SDV control processor 303, which is under the control of the SDV on-board computer 301 (based on instructions provided by controller 201). That is, by the SDV on-board computer 301 processing driving instructions received (e.g., from the controller 201 shown in FIG. 2) by a communications transceiver 317 and inputs taken from navigation and control sensors 309, then the SDV 302 is able to autonomously drive itself.

Thus, communications transceiver 317 is able to receive and transmit electronic communication signals (e.g., RF messages) from and to other communications transceivers found in other vehicles, servers, monitoring systems, etc. This enables SDV control processor 303 to autonomously control SDV vehicular physical control mechanisms 305 (e.g., the engine throttle, steering mechanisms, braking systems, turn signals, etc.) on SDV 302.

As just mentioned, the SDV on-board computer 301 uses outputs from navigation and control sensors 309 to control the SDV 302. Navigation and control sensors 309 include hardware sensors that 1) determine the location of the SDV 302; 2) sense other cars and/or obstacles and/or physical structures around SDV 302; 3) measure the speed and direction of the SDV 302; and 4) provide any other inputs needed to safely control the movement of the SDV 302.

With respect to the feature of 1) determining the location of the SDV 302, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 302. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 302, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., the same transceiver 323 that emitted the electromagnetic radiation). An exemplary positioning system within SDV 302 is a Light Detection and Ranging (LIDAR) (e.g., the depicted LIDAR 333) or Laser Detection and Ranging (LADAR) system that measures the time it takes to receive back the emitted electromagnetic radiation (e.g., light), and/or evaluate a Doppler shift (i.e., a change in frequency to the electromagnetic radiation that is caused by the relative movement of the SDV 302 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 302, this can be accomplished by taking readings from an on-board speedometer (not depicted) on the SDV 302 and/or detecting movements to the steering mechanism (also not depicted) on the SDV 302 and/or the positioning system 151 discussed above.

With respect to the feature of 4) providing any other inputs needed to safely control the movement of the SDV 302, such inputs include, but are not limited to, control signals to activate a horn, turning indicators, flashing emergency lights, etc. on the SDV 302.

In one or more embodiments of the present invention, SDV 302 includes roadway sensors 311 that are coupled to the SDV 302. Roadway sensors 311 may include sensors that are able to detect the amount of water, snow, ice, etc. on a roadway (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc. Roadway sensors 311 may also include sensors that are also able to detect how dark the roadway is using light sensors.

Similarly, a dedicated camera 321 can be trained on an area around SDV 302, in order to recognize current weather conditions, roadway conditions, etc. around the SDV 302.

In one or more embodiments of the present invention, also within the SDV 302 are SDV equipment sensors 315. SDV equipment sensors 315 may include cameras aimed at tires on the SDV 302 to detect how much tread is left on the tire. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 302, including lights (e.g., using circuitry that detects if a bulb is broken), wipers (e.g., using circuitry that detects a faulty wiper blade, wiper motor, etc.), etc.

In one or more embodiments of the present invention, also within SDV 302 is a telecommunication device 325, which is able to send messages to a telecommunication device (e.g., when vehicle-based transceiver 218 is operating on a cellular network).

In one or more embodiments of the present invention, SDV 302 also includes SDV physical configuration mechanisms 307, which are under the control of the SDV on-board computer 301. Examples of SDV physical configuration mechanisms 307 are mechanisms that control seating configurations, doors being opened, trunks being opened, etc., as well as the cargo repositioning mechanism 222 shown in FIG. 2 (for automatically up-righting cargo that has fallen over). While the cargo repositioning mechanism 222 is shown on the floor of the interior of the cargo container 212, alternatively such a mechanism may be suspended from a ceiling of the cargo container 212, a side of the interior of the cargo container 212, etc.

As discussed above, autonomous vehicles are capable of controlling their own movement automatically. Autonomous vehicles can also receive commands from a central controller (e.g., vehicle controller 201 shown in FIG. 2), which may be a cloud server (i.e., a real or virtual server than is available via a wide area network). As such, the present invention enables the system to control many autonomous vehicles (e.g., SDVs) remotely with a graphical user interface (GUI) based approach, so that a single operator or team of operators can control numerous autonomous vehicles in an efficient manner.

Figure 4:
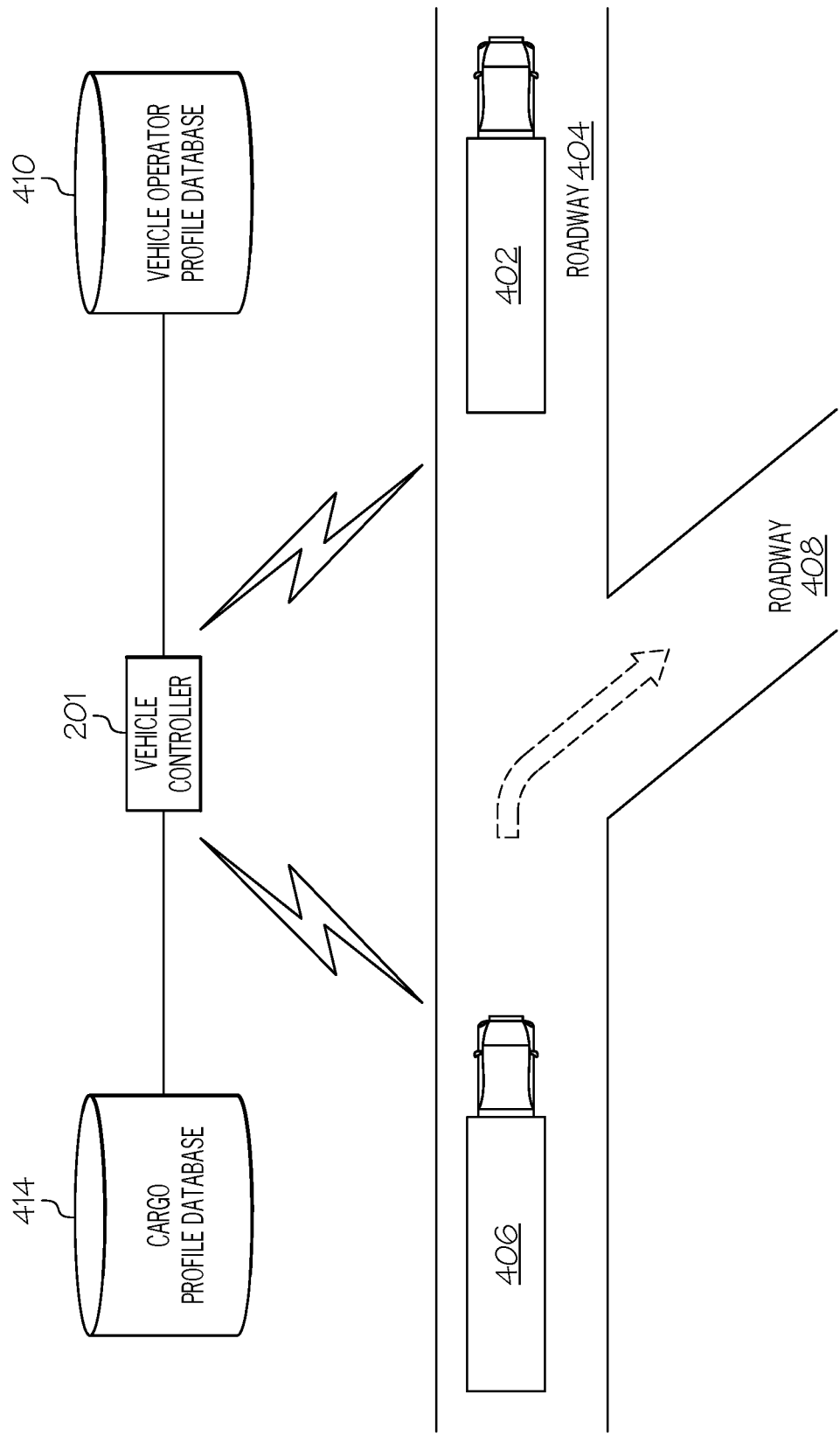
FIG. 4 illustrates a second vehicle being directed to an alternate route based on readings derived from a first vehicle.

With reference now to FIG. 4, assume that vehicle 402 is a cargo truck transporting cargo along a roadway 404. However, the condition of roadway 404 is poor, due to potholes, roadway construction, icing, etc., which has caused the cargo being transported by vehicle 402 to fall over and become damaged. Sensors on vehicle 402 (e.g., cargo state sensor 214, cargo bay camera 216, cargo vehicle state sensor 220 shown in FIG. 2) generate information about the state of the cargo within vehicle 402 and/or the state of vehicle 402 itself and/or the state of the environment (e.g., roadway) through which vehicle 402 is traveling.

The vehicle-based transceiver (e.g., vehicle-based transceiver 218 shown in FIG. 2) on vehicle 402 then transmits this information (i.e., cargo, cargo vehicle, and/or environmental information) to the vehicle controller 201. The vehicle controller 201 evaluates this information, and generates an instruction/recommendation for vehicle 406 to avoid roadway 404 by taking roadway 408 (which is in better condition, and therefore less likely to cause damage to the cargo inside vehicle 406) instead.

In an embodiment of the present invention, instructions to modify how vehicle 402 and/or vehicle 406 are driven (either by a human operator or by the SDV on-board computer 301 shown in FIG. 3) are further adjusted by the abilities of the operator (human or electronic). These abilities are described in a vehicle operator profile database 410.

For example, assume that the driver of vehicle 406 is a human driver. Assume further that a driving history for that human driver (as found in vehicle operator profile database 410) shows a record of that human driver having a poor safety record when driving on rough roadways. As such, the vehicle controller 201 will instruct the human driver of vehicle 406 to avoid the rough roadway 404 and to turn onto the alternate route provided by the smoother roadway 408.

In an embodiment, the human driver is issued instructions to adjust his driving style due to the cargo being carried and the road conditions. For example, the human driver may be directed to greatly reduce the speed of vehicle 406 in order to prevent further damage to the cargo being transported in vehicle 406. However, the vehicle operator profile database 410 may reveal that the human driver of vehicle 406 has a history of being reluctant to drive below the posted speed limit. Based on this information, rather than instructing the human driver of vehicle 406 to greatly reduce the speed of vehicle 406, the vehicle controller 201 will direct the human driver to avoid roadway 404 and to turn onto roadway 408.

Assume now that the driver of vehicle 406 is the SDV on-board computer 301 shown in FIG. 3 (i.e., vehicle 406 shown in FIG. 4 is an SDV). Assume further that the SDV on-board computer 301 is capable of activating the cargo repositioning mechanism 222 shown in FIG. 2 and/or reconfiguring the SDV vehicular physical control mechanisms 305 shown in FIG. 3 in order to compensate for the rough road conditions on roadway 404.

For example, the SDV on-board computer 301 may cause the cargo repositioning mechanism 222 shown in FIG. 2 to extend in order to provide additional support to a cargo box, thus preventing it from falling over while vehicle 406 is traveling on the rough roadway 404.

Similarly, the SDV on-board computer 301 may reconfigure the SDV vehicular physical control mechanisms 305 to reduce the maximum speed of vehicle 406, adjust air shocks on vehicle 406, or otherwise adjust the configuration of vehicle 406 in order to compensate for the rough road conditions on roadway 404, thus preventing cargo within vehicle 406 from shifting or falling while traveling across rough roadway 404.

Also accessible to the vehicle controller 201 is a cargo profile database 414, which includes information about cargo being carried in vehicle 402 and/or vehicle 406. Such information includes, but is not limited to, a weight of each subunit of the cargo; a monetary value of each subunit of the cargo; a level of fragility (i.e., how susceptible it is to breakage from falling over, being struck, etc.) of each subunit of the cargo; a history of shifting and/or vibration experienced by the cargo during transport; etc.

While cargo protection has been described thus far as being provided by adjusting how the cargo vehicle is operated and/or configured, in one or more embodiments such protection is provided by adjusting how the cargo itself is loaded. That is, certain high-value cargo should be loaded in such a manner that makes it unlikely that 1) it will fall over or 2) that it will strike/be struck by other cargo.

Figure 5:
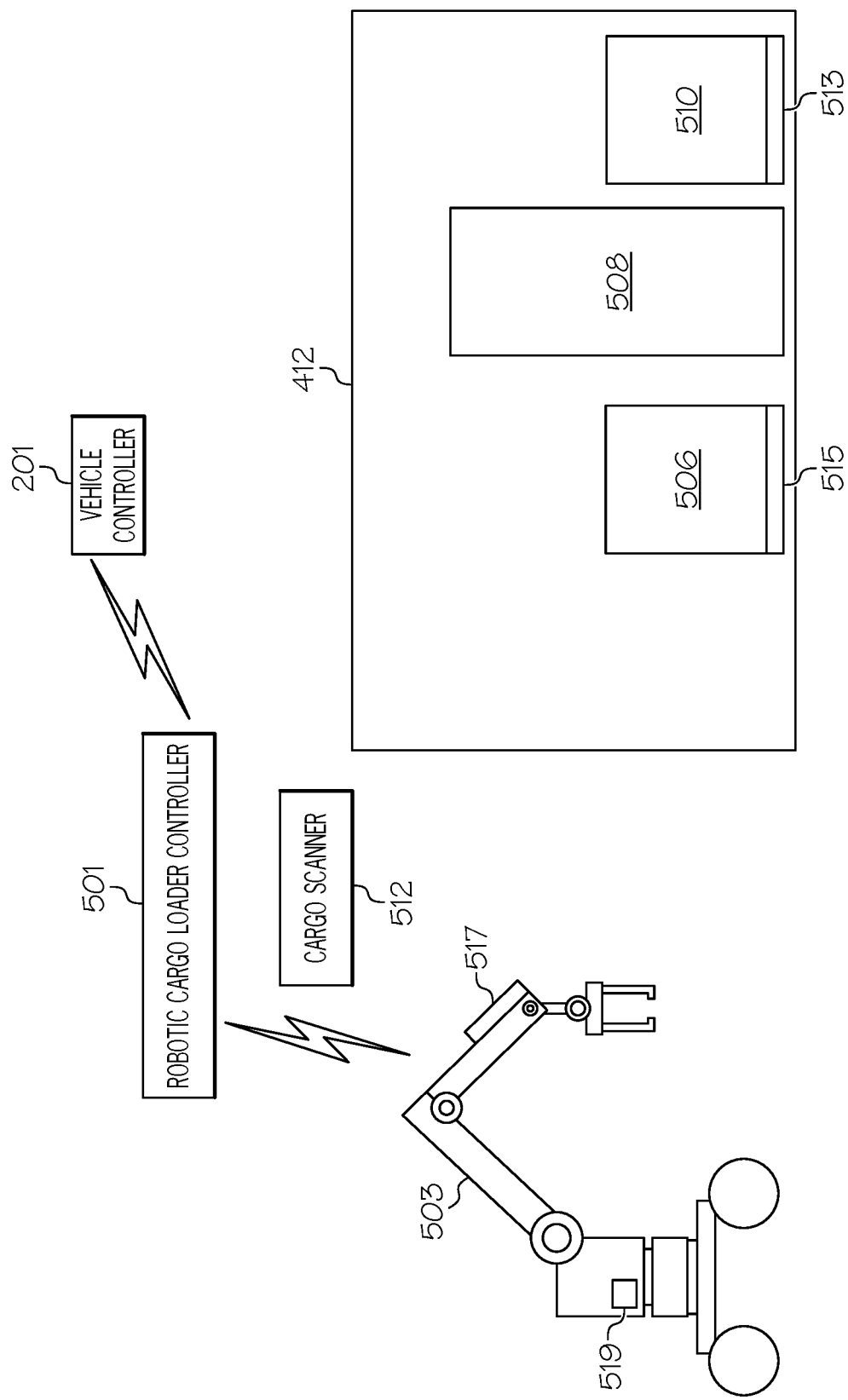
FIG. 5 depicts an exemplary robotic cargo loader loading cargo into a cargo container based on readings from a vehicle controller that is monitoring vehicles that are currently in transit.

For example, consider now the cargo being loaded in FIG. 5. Assume that box 506 contains high value goods that are delicate (e.g., television sets). As such, they will be damaged if box 508 falls against them (assuming the box 508 is heavy enough to damage box 506). Similarly, if box 510 contained high value fragile objects (e.g., crystal glassware), then such objects would be damaged if box 510 were to fall over.

As such, one or more embodiments of the present invention utilize the information generated by a lead vehicle (e.g., vehicle 402 shown in FIG. 4), which describes conditions within the cargo container 412 (analogous to container 212 in FIG. 2) for that lead vehicle and/or road conditions upon which that lead vehicle is traveling.

For example, assume that vehicle 402 and vehicle 406 shown in FIG. 4 are similar cargo vehicles (e.g., the same make, model, condition, etc.), as detected by a cargo scanner 512 that scans bar codes on boxes as they are being loaded onto the cargo container 412. Assume further that they are both carrying the same types of cargo (e.g., television sets). Assume further that they are both scheduled to travel along the same route, or at least roadways having similar conditions (smooth or rough, wet or dry, straight or winding, etc.). If vehicle 402 has experienced cargo issues (e.g., a box falling over), then vehicle 406 will "learn from the mistakes"

of vehicle 402, and will be loaded differently. For example, boxes will be stacked closer together, strapped down tighter, given additional padding between them, etc.

Thus, the cargo being loaded onto cargo container 412 (which will be transported by vehicle 406) is performed 1) before vehicle 406 leaves the loading dock and 2) by an autonomous loader (e.g., robotic cargo loader 503 shown in FIG. 5). That is, a robotic cargo loader controller 501 (e.g., a computerized controller for the robotic cargo loader 503) will receive information from the vehicle controller 201 about the state of vehicle 402 and how its cargo was arranged and secured at the time that its cargo was damaged.

For example, assume that vehicle 402 in FIG. 4 was carrying the boxes 206, 208, and 210 as depicted in FIG. 2. Since box 206 was struck by box 208, box 208 fell over, and box 210 fell down, vehicle controller 201 deduces that their loading configuration was faulty for the road/vehicle conditions. As such, vehicle controller 201 (knowing that cargo container 412 is being loaded with similar cargo as that carried by vehicle 402 and that cargo container 412 will be transported by vehicle 406) will send instructions to robotic cargo loader controller 501, directing the robotic cargo loader controller 501 to direct an on-board microprocessor 519 on the robotic cargo loader 503 to load boxes 506, 508, and 510 (similar in weight and/or structure and/or content as boxes 206, 208, and 210 in vehicle 402) in a manner (previously ascertained) that will provide additional support/protection for road conditions that will be experienced by vehicle 406.

In one or more embodiments of the present invention, the analytics will evaluate how the cargo is protected. For example, if the analytics show that certain cargo is prone to falling over during transit, then the analytics will recommend that such cargo is protected by protective surroundings, which may be cushioned, rigid, etc.

In one or more embodiments of the present invention, boxes 506, 508, and 510 are placed on positions within the cargo container 412 that are marked by bar codes placed in the interior of the cargo container 412. The robotic cargo loader 503 will search for particular bar codes that identify locations within the cargo container 412, and then will place particular boxes (e.g., boxes 506, 508, and 510) at these locations, in accordance with information received from the vehicle controller 201. For example, a position bar code 513 located (e.g., painted on, stuck upon, etc.) at the front of cargo container 412 may identify the optimal location for box 510, while a position bar code 515 placed towards the rear of cargo container 412 may identify the optimal location for box 506. These bar codes may be permanently affixed to the interior of cargo container 412, and are then selectively assigned to certain boxes (box 506, box 508, and/or box 510) for placement thereon. A position bar code reader 517 on the robotic cargo loader 503 and/or on other location will read the position bar codes in order to identify where each box (subunit of the cargo) is placed and/or should be relocated according to cargo history for other transports.

In an embodiment of the present invention, the location of particular boxes (e.g., boxes 506, 508, and 510) is determined by the relative values of goods stored within the particular boxes and/or their likelihood of breakage. For example, if box 508 in FIG. 5 contains nothing but pillows, then it doesn't matter to the pillows if box 508 falls over. However, if box 506 contains very fragile glassware, and box 508 is top heavy enough that it is likely to fall over against box 506, then box 508 will not be loaded next to box 506. The robotic cargo loader controller 501 will run multiple simulations for loading boxes 506, 508, and 510 in order to develop the optimal load configuration for minimizing risk (from a box falling over or from a box being struck by another box) to the cargo within the cargo container 412.

Thus, in one or more embodiments of the present invention, a vehicle (e.g., a truck) is equipped with Internet-of-things (IOT) sensors (e.g., cargo state sensor 214 and/or cargo vehicle state sensor 220, and/or accelerometer sensors such as box sensor 224, and/or a video camera such as cargo bay camera 216 shown in FIG. 2) to monitor for cargo movement. Similarly, a cargo vehicle state sensor 220 can be used to monitor road conditions, based on tire vibrations, video images of the roadway, etc.

The condition of the road will be sent to an analytics system (e.g., vehicle controller 201 shown in FIG. 2) based on the data from the cargo vehicle state sensor 220, which may include tire sensors. This data is used to determine if re-route actions need to be taken.

The movement of cargo within the truck is detected by the IOT sensors within the shipping compartment (e.g., within cargo container 212 shown in FIG. 2) along with a video stream from the cargo bay camera 216. This data is also sent to the analytics system.

In one or more embodiments of the present invention, a system and method identify cargo that needs to be repositioned during loading in order to reduce the possibility of damage to the cargo during transport. Similar cargo (in size, shape, value, weight, etc.) is monitored by sensors on a first truck (e.g., vehicle 402 shown in FIG. 4) and stored in a central database (e.g., the cargo profile database 414 shown in FIG. 4).

The location into which each box (i.e., subunit of the entire cargo) may be loaded is detected by a bar code reader on a robotic cargo loader (e.g., robotic cargo loader 503) or other scanning device, which shows the location at which each subunit of cargo is positioned within the cargo container.

The value of the boxes at risk is calculated by reviewing the manifest (e.g., from the cargo profile database 414) for cost and probability of breakage (e.g., pillows do not break, fine china does break) when falling. This probable risk in dollars is defined for each item in the cargo manifest by multiplying the risk odds of a particular box falling over (e.g., 20%) by the value of that particular box (e.g., $500.00 USD) in order to obtain a summed risk value for that particular box.

The system then utilizes this summed risk value (i.e., probable risk dollars) to determine which boxes should be moved and to where by running simulations of multiple loading permutations. The system then re-calculates the summed risk value after the boxes are moved based on the new location, and further determines if such movement has increased for other boxes in the cargo container (e.g., by the introduction of new falling hazards created by repositioning the cargo subunits).

Figure 6:
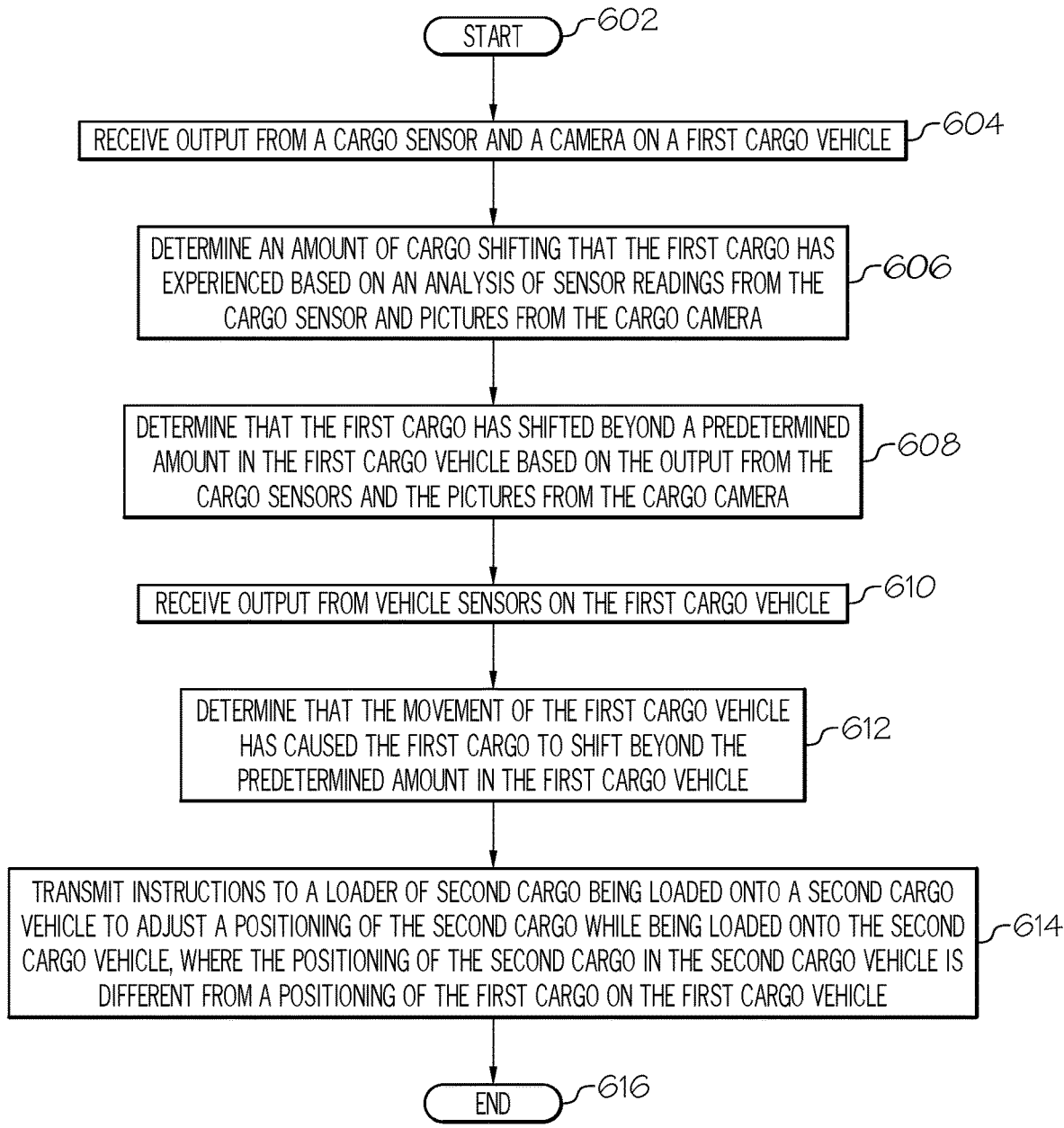
FIG. 6 is a high-level flow chart of one or more steps performed by one or more processors and/or other hardware devices to load cargo in accordance with one or more embodiments of the present invention.

With reference now to FIG. 6, a high-level flow chart of one or more steps performed by one or more processors and/or other hardware devices to load cargo onto a cargo vehicle in accordance with one or more embodiments of the present invention.

After initiator block 602, one or more processors (e.g., within the vehicle controller 201 and/or the robotic cargo loader controller 501 shown in FIG. 5) receive output from a cargo sensor (e.g., cargo state sensor 214 shown in FIG. 2) and a camera (e.g., cargo bay camera 216 shown in FIG. 2) on a first cargo vehicle (e.g., vehicle 402 shown in FIG. 4), as described in block 604 of FIG. 6. The output from the cargo sensor and the camera describes an amount of movement of first cargo (e.g., boxes 206, 208, and 210 shown in FIG. 2) being transported by the first cargo vehicle.

As described in block 606 of FIG. 6, the processors then determine an amount of cargo shifting that the first cargo has experienced (i.e., how much the boxes have physically shifted/moved during transit by the first cargo vehicle) based on an analysis of sensor readings from the cargo sensor and pictures from the cargo camera.

As described in block 608 of FIG. 6, the processors now determine that the first cargo has shifted beyond a predetermined amount in the first cargo vehicle based on the output from the cargo sensors and the pictures from the cargo camera.

As described in block 610 of FIG. 6, the processors receive output from vehicle sensors (e.g., cargo vehicle state sensor 220 shown in FIG. 2) on the first cargo vehicle. The output from the vehicle sensors describe a movement (e.g., sudden starts and stops, swerving, bumping up and down, etc.) of the first cargo vehicle.

As described in block 612 of FIG. 6, the processors then determine that the movement of the first cargo vehicle has caused the first cargo to shift beyond the predetermined amount in the first cargo vehicle.

As described in block 614 of FIG. 6, the processors then transmit instructions to a loader (e.g., the robotic cargo loader 503 shown in FIG. 5) of second cargo (e.g., boxes 506, 508, and 510) being loaded onto a second cargo vehicle (e.g., vehicle 406 while being loaded). These instructions direct the loader to adjust a positioning of the second cargo while being loaded onto the second cargo vehicle, where the positioning of the second cargo in the second cargo vehicle is different from a positioning of the first cargo on the first cargo vehicle. That is, since excessive shifting resulted from the positioning used in the first vehicle, then the cargo in the second vehicle is positioned in a different position.

The flow-chart ends at terminator block 616.

Thus, in one or more embodiments of the present invention, the system uses analytics to evaluate and predict how cargo will behave during transit. That is, the system takes readings from sensors on one or more cargo vehicles, which identify the amount of movement that each subunit of their cargo (e.g., boxes or other individual goods) has experienced in these other cargo vehicles, the amount and type of movement of the cargo vehicles while in transit, the route taken by the cargo vehicles, etc. The system also incorporates the shape of the subunits of cargo, the weight of the subunits of cargo, the monetary value of the subunits of cargo, the critical need for of the subunits of cargo, etc., and generates multiple simulations of different loading patterns and their consequences.

That is, multiple simulations show the amount of shifting, breakage, delay, etc. caused by various loading procedures, as described herein. An optimal loading pattern is identified from these simulations, based on the least amount of shifting of cargo that is predicted during transit by a present cargo vehicle (that is about to be loaded), the least amount of breakage of the cargo during transit by the present cargo vehicle, the impact on service level agreements and other factors that may result from providing additional padding, etc. to the cargo load, the efficiency in loading and unloading of the cargo subunits, etc.

Once the optimal loading plan is developed by the analytics, the present cargo vehicle is loaded in accordance with the developed optimal loading plan. That is, in a preferred embodiment, the multiple simulations are run prior to loading the present cargo vehicle, in order to develop the optimal loading plan before cargo loading on the present cargo vehicle commences.

In an embodiment of the present invention, the instructions to the loader of the second cargo instruct the loader of the second cargo to reposition the second cargo in the second cargo vehicle based on a value of each subunit of the second cargo being loaded onto the second cargo vehicle. For example, boxes containing more valuable cargo may be loaded away from other boxes (in order to avoid being struck by other boxes that fall over), or they may be stored at the bottom of a stack of boxes in order to avoid being damaged if the stack falls over (assuming that the bottom box holding the more valuable goods is able to support the weight of the boxes stacked above it.)

In an embodiment of the present invention, the instructions to the loader of the second cargo instruct the loader of the second cargo to reposition the second cargo in the second cargo vehicle based on a weight of each subunit of the second cargo being loaded onto the second cargo vehicle. That is, lighter boxes are loaded on top of heavier boxes.

In an embodiment of the present invention, the instructions to the loader of the second cargo instruct the loader of the second cargo to reposition the second cargo in the second cargo vehicle based on a physical size of each subunit of the second cargo being loaded onto the second cargo vehicle. For example, if a first box has X-Y planar dimensions of 12 inches by 12 inches, then it would be stacked on top of a box that has planar dimensions of 20 inches by 20 inches. Similarly, if a third box has a Z dimension of 20 inches (i.e., is 20 inches tall), then it would be stacked above a fourth box that is 30 inches tall, since stacking these two boxes in the other order would be unstable.

In an embodiment of the present invention, the instructions to the loader of the second cargo instruct the loader of the second cargo to limit a volume of the second cargo being loaded onto the second cargo vehicle.

For example, assume that a cargo load (as identified by the cargo manifest) is for a total of 1,000 cubic feet, which is the maximum capacity of a first cargo vehicle. Assume further that if all 1,000 cubic feet of space are used, that there will be no room for padding between the boxes and/or that the cargo bay camera's view will be blocked. In order to remedy this problem, the system (e.g., vehicle controller 201 shown in FIG. 5) will split up the load into one more lots (subsets of the cargo), and will then instruct the robotic cargo loader 503 to load one of the lots into a first cargo container and other lots into other cargo containers for transport.

In an embodiment of the present invention, the instructions to the loader of the second cargo direct the loader of the second cargo to load the second cargo onto the second cargo vehicle based on the risk/reward of damage to the second cargo, a cost of the second cargo, and a cost of delayed delivery of the second cargo based on simulations of multiple loading permutations of the second cargo.

For example, risk/reward of damage to the second cargo compares the amount of risk to the cargo with the reward for ameliorating that risk. For example, assume that there is a 50% chance of the cargo being damaged during transit, which would result in the cargo losing 50% of its value. If the cargo is not damaged, then the reward is preserving that 50% of its value, so that the risk/reward ratio is 1.00 (the ratio of the 50% risk of damage to the 50% retention of value). In another example, however, the risk/reward is not a simple ratio. For example, assume that that risk of breaking a mission critical device (e.g., an electronic controller for a refinery) is still 50%. However, if the electronic controller arrives at its destination broken, then the refinery may be shut down for a week while workers wait for a new electronic controller to arrive. Thus, the reward for receiving an undamaged electronic controller is to keep the refinery running during that week, while the risk is that the electronic controller has a 50% chance of being damaged. This risk is too high (based on the consequences of it arriving damaged at the refinery), and thus the system will issue directives to modify how it is loaded onto the cargo vehicle, in order to reduce this risk.

Similarly, the cost of the second cargo may be a determining factor on how the cargo is loaded. That is, if the second cargo is nothing but inexpensive cargo (e.g., used glass being destined for recycling), then the system may employ any economically advantageous loading scenario, since breakage will not alter its value. However, if the cargo is expensive china (e.g., dinner plates), then the system will take steps (based on the analysis of other shipments as described herein) to ensure that the risk of breakage to this cargo is reduced.

Similarly, the cost of delayed delivery of the second cargo based on simulations of multiple loading permutations of the second cargo may determine whether or not it is reconfigured for loading. For example, assume that as originally loaded, computer simulations show that the average amount of breakage of the cargo is 5%. Assume further that if the cargo in the cargo container is repositioned (e.g., at the warehouse), such repositioning will reduce the breakage down to 2%, but will take another two hours to reposition the cargo. However, this two-hour delay may result in a 10% surcharge, since a service level agreement (SLA) with the customer has a 10% penalty if the cargo does not arrive on time. As such, it is more economical for the cargo transporter to ship the cargo as originally loaded and to pay for the 5% breakage, than to take two extra hours to reload the cargo, pay for the 2% breakage, and also pay the 10% SLA penalty for being late. Thus, the system would not rearrange the cargo. Alternatively, if the analysis revealed that it would be cheaper to rearrange the cargo (e.g., reducing breakage from 30% to 5% for a 25% savings) and to pay the SLA penalty (10%), then the sum charge is only 15% (25% savings−10% SLA penalty) rather than the original breakage charge of 30%.

In an embodiment of the present invention, the first cargo vehicle and the second cargo vehicle are a same type of cargo vehicle. For example, both cargo vehicles may be semi-tractor trailer rigs, bobtail trucks, etc. Thus, the behavior of the first cargo vehicle and the second cargo vehicle will be substantially alike on similar routes.

In an embodiment of the present invention, the loader of the cargo being loaded onto the second cargo vehicle is a robot (e.g., robotic cargo loader 503 shown in FIG. 5), and the instructions are to an on-board electronic controller (e.g., the on-board microprocessor 519 shown in FIG. 5).

In an embodiment of the present invention, the system (e.g., vehicle controller 201) receives output from vehicle sensors on the first cargo vehicle, which describe a movement of the first cargo vehicle, and then determine that the movement of the first cargo vehicle has caused the cargo to shift in the first cargo vehicle beyond the predetermined amount. The system then compares a first structure of the first cargo vehicle to a second structure of the second cargo vehicle. For example, assume that the first cargo vehicle and the second cargo vehicle are the same make, model, and year of a type of truck. As such, if the first cargo vehicle had no cargo damage for a certain route transporting a certain type of cargo, then the second cargo vehicle scheduled to take the same type of cargo over this same route would be loaded just as the first cargo vehicle was loaded. However, if the first cargo vehicle is a truck with floating suspension (e.g., air shocks) while the second cargo vehicle is a truck with rigid suspension (e.g., hard spring shocks), then the positioning of the cargo in the second cargo vehicle will be modified, in order to accommodate for the harsher ride that will be afforded by the second cargo vehicle.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
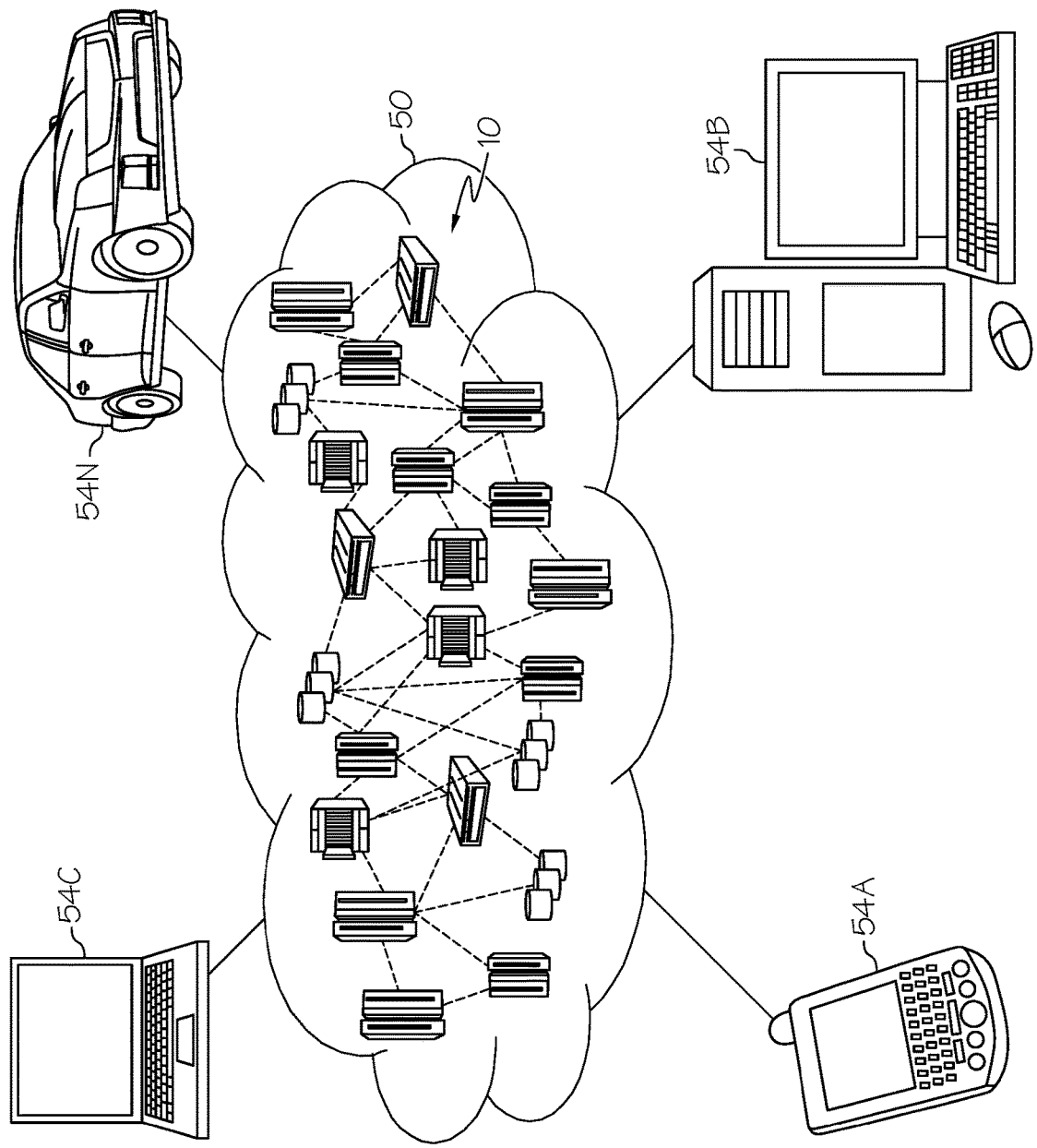
FIG. 7 depicts a cloud computing node according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
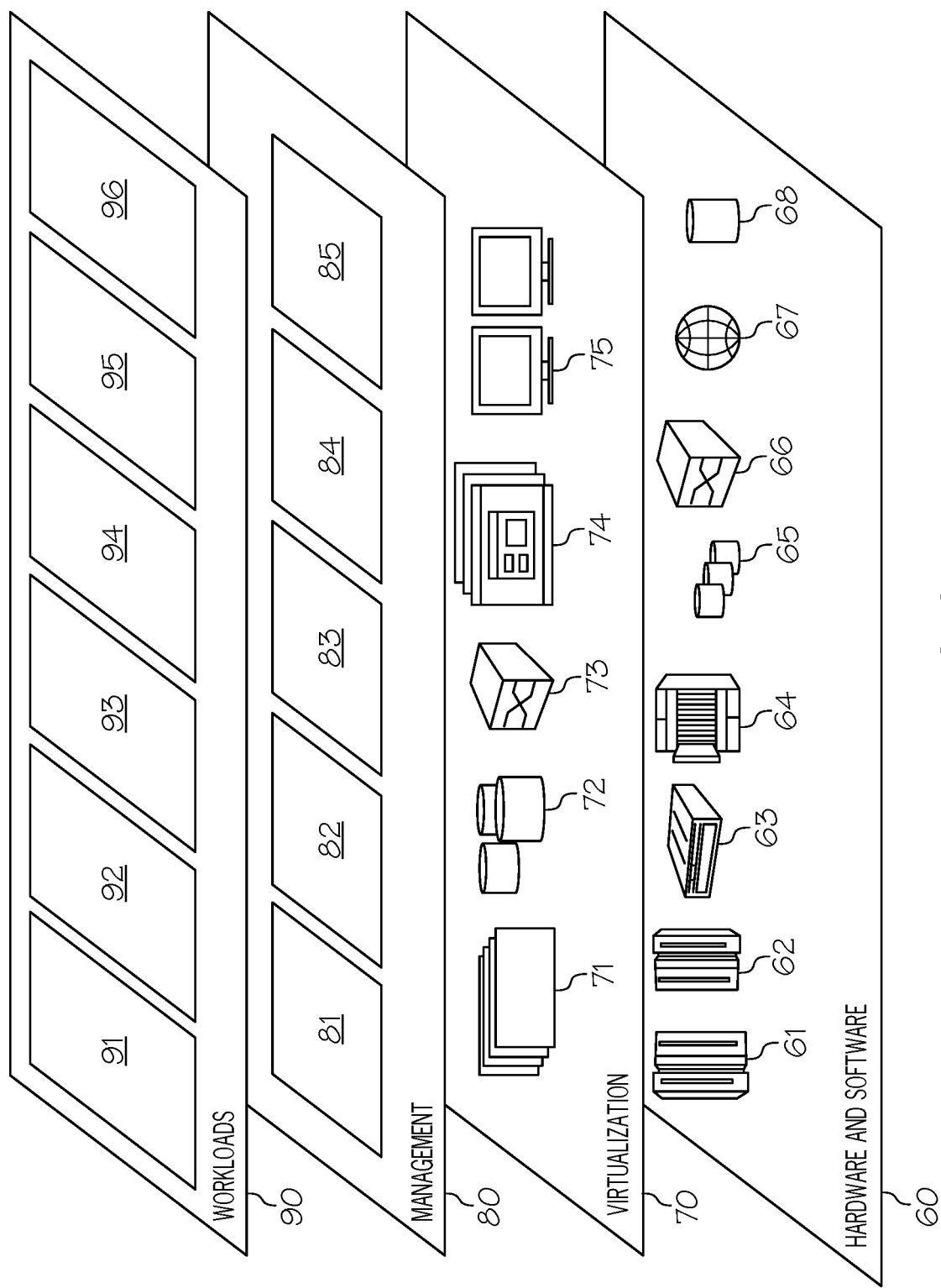
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cargo vehicle loading control processing 96.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by one or more processors, output from a cargo sensor, wherein the output from the cargo sensor describes an amount of shifting experienced by a first cargo while being transported by a first cargo vehicle;
   determining, by one or more processors, that the first cargo has shifted beyond a predetermined amount in the first cargo vehicle based on the output from the cargo sensor; and
   transmitting, by one or more processors, instructions to a robotic cargo loader of second cargo being loaded onto a second cargo vehicle to adjust a positioning of the second cargo while being loaded onto the second cargo vehicle based on the first cargo shifting beyond the predetermined amount while being transported by the first cargo vehicle, wherein the positioning of the second cargo in the second cargo vehicle is different from a positioning of the first cargo on the first cargo vehicle.

2. The method of claim 1, wherein the instructions to the robotic cargo loader of the second cargo instruct the robotic cargo loader of the second cargo to reposition the second cargo in the second cargo vehicle based on a value of each subunit of the second cargo being loaded onto the second cargo vehicle.

3. The method of claim 1, wherein the instructions to the robotic cargo loader of the second cargo instruct the robotic cargo loader of the second cargo to reposition the second cargo in the second cargo vehicle based on a weight of each subunit of the second cargo being loaded onto the second cargo vehicle.

4. The method of claim 1, wherein the instructions to the robotic cargo loader of the second cargo instruct the robotic cargo loader of the second cargo to reposition the second cargo in the second cargo vehicle based on a physical size of each subunit of the second cargo being loaded onto the second cargo vehicle.

5. The method of claim 1, wherein the instructions to the robotic cargo loader of the second cargo instruct the robotic cargo loader of the second cargo to limit a volume of the second cargo being loaded onto the second cargo vehicle.

6. The method of claim 1, further comprising:
   dividing, by one or more processors, the second cargo into multiple subsets of second cargo; and
   loading, by the robotic cargo loader, each of the multiple subsets of second cargo into a separate cargo vehicle for transport.

7. The method of claim 1, wherein the instructions to the robotic cargo loader of the second cargo direct the robotic cargo loader of the second cargo to load the second cargo onto the second cargo vehicle based on the risk/reward of damage to the second cargo, a cost of the second cargo, and a cost of delayed delivery of the second cargo based on simulations of multiple loading permutations of the second cargo.

8. The method of claim 1, wherein the first cargo vehicle and the second cargo vehicle are a same type of cargo vehicle.

9. The method of claim 1, wherein the robotic cargo loader of the cargo being loaded onto the second cargo vehicle includes an on-board electronic controller, and wherein the instructions are transmitted to the on-board electronic controller of the robotic cargo loader.

10. The method of claim 1, further comprising:
    comparing, by one or more processors, a first structure of the first cargo vehicle to a second structure of the second cargo vehicle; and
    further modifying, by one or more processors, the positioning of the second cargo on the second cargo vehicle based on a comparison of first structure of the first cargo vehicle to the second structure of the second cargo vehicle.

11. The method of claim 1, wherein the cargo sensor is from a group consisting of a microphone, a camera, a mechanical vibration sensor, and a chemical sensor.

12. The method of claim 1, wherein the cargo sensor is a light sensor, wherein the first cargo includes a container, wherein the first cargo vehicle has an opaque soft wall that is capable of being punctured by the container when the container shifts beyond the predetermined amount, and wherein the method further comprises:
    detecting, by the light sensor, light coming in through the opaque soft wall;
    in response to detecting the light coming in through the opaque soft wall, determining, by one or more processors, that the container has broken through the opaque soft wall in response to movement of the first cargo vehicle causing the container to shift beyond the predetermined amount in the first cargo vehicle; and
    in response to determining that the container has broken through the opaque soft wall, further determining, by one or more processors, that the movement of the first cargo vehicle has caused the first cargo to shift beyond the predetermined amount in the first cargo vehicle.

13. The method of claim 1, wherein the cargo sensor is a gyroscope, and wherein the method further comprises:
    detecting, by the gyroscope, that the first cargo vehicle traveled on an incline that caused the first cargo to shift; and
    in response to determining that the first cargo vehicle traveled on the incline that caused the first cargo to shift, further determining, by one or more processors, that movement of the first cargo vehicle has caused the first cargo to shift beyond the predetermined amount in the first cargo vehicle based on the incline that caused the first cargo to shift.

14. The method of claim 1, further comprising:
    determining, by one or more processors, that a container that is part of the first cargo has fallen over when the first cargo shifted beyond the predetermined amount; and in response to determining that the container has fallen over, activating, by one or more processors, an electromechanical device on the first cargo vehicle to reposition the container into an upright position.

15. The method of claim 1, wherein the first cargo vehicle was taking a first route when the first cargo shifted beyond the predetermined amount, wherein the second cargo vehicle is scheduled to travel on the first route, wherein the second cargo vehicle is a self driving vehicle (SDV), and wherein the method further comprises:
receiving, by one or more processors, sensors readings that describe a movement of the first cargo vehicle while traveling on the first route;
determining, by one or more processors and based on the movement of the first cargo vehicle while traveling on the first route, that the first route has roadway surface conditions that caused the first cargo to shift beyond the predetermined amount;
in response to determining that the first route has roadway surface conditions that caused the first cargo to shift beyond the predetermined amount, redirecting, by one or more processors, the SDV to take a second route that is different from the first route.

16. A computer program product comprising one or more computer readable storage mediums, and program instructions stored on at least one of the one or more storage mediums, the stored program instructions comprising:
program instructions to receive output from a cargo sensor, wherein the output from the cargo sensor describes an amount of shifting experienced by a first cargo while being transported by a first cargo vehicle;
program instructions to determine that the first cargo has shifted beyond a predetermined amount in the first cargo vehicle based on the output from the cargo sensor; and
program instructions to transmit instructions to a robotic cargo loader of second cargo being loaded onto a second cargo vehicle to adjust a positioning of the second cargo while being loaded onto the second cargo vehicle based on the first cargo shifting beyond the predetermined amount while being transported by the first cargo vehicle, wherein the positioning of the second cargo in the second cargo vehicle is different from a positioning of the first cargo on the first cargo vehicle.

17. The computer program product of claim 16, further comprising:
program instructions to compare a first structure of the first cargo vehicle to a second structure of the second cargo vehicle; and
program instructions to further modify the positioning of the second cargo on the second cargo vehicle based on a comparison of first structure of the first cargo vehicle to the second structure of the second cargo vehicle.

18. The computer program product of claim 16, wherein the cargo sensor is from a group consisting of a microphone, a camera, a mechanical vibration sensor, and a chemical sensor.

19. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:
program instructions to receive output from a cargo sensor, wherein the output from the cargo sensor describes an amount of shifting experienced by a first cargo while being transported by a first cargo vehicle;
program instructions to determine that the first cargo has shifted beyond a predetermined amount in the first cargo vehicle based on the output from the cargo sensor; and
program instructions to transmit instructions to a robotic cargo loader of second cargo being loaded onto a second cargo vehicle to adjust a positioning of the second cargo while being loaded onto the second cargo vehicle based on the first cargo shifting beyond the predetermined amount while being transported by the first cargo vehicle, wherein the positioning of the second cargo in the second cargo vehicle is different from a positioning of the first cargo on the first cargo vehicle.

20. The computer system of claim 19, wherein the cargo sensor is from a group consisting of a microphone, a camera, a mechanical vibration sensor, and a chemical sensor.

\* \* \* \* \*